(12) United States Patent
Sriram

(10) Patent No.: US 6,366,606 B1
(45) Date of Patent: Apr. 2, 2002

(54) PROGRAMMABLE CORRELATOR COPROCESSOR DEVICE AND METHOD

(75) Inventor: Sundararajan Sriram, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/244,518

(22) Filed: Feb. 4, 1999

Related U.S. Application Data

(60) Provisional application No. 60/073,736, filed on Feb. 5, 1998.

(51) Int. Cl.$^7$ .............................................. H04L 27/30
(52) U.S. Cl. ....................................... 375/150; 375/147
(58) Field of Search ................................ 375/150, 147, 375/142, 143, 152, 149, 145, 367, 343

(56) References Cited

U.S. PATENT DOCUMENTS

| | | | | |
|---|---|---|---|---|
| 5,764,687 A | * | 6/1998 | Easton | 375/206 |
| 5,956,367 A | * | 9/1999 | Koo et al. | 375/206 |
| 6,122,311 A | * | 9/2000 | Watanabe et al. | 375/147 |
| 6,144,691 A | * | 11/2000 | Kenney | 375/130 |
| 6,157,631 A | * | 12/2000 | Rohani | 370/342 |
| 6,178,197 B1 | * | 1/2001 | Froelich et al. | 375/150 |

\* cited by examiner

*Primary Examiner*—Chi Pham
*Assistant Examiner*—Khai Tran
(74) *Attorney, Agent, or Firm*—J. Dennis Moore; W. James Brady, III; Frederick J. Telecky, Jr.

(57) ABSTRACT

The present invention is a digital transmissions receiver system which includes digital transmissions receiver (10) and correlation co-processor (12). Optionally, an additional memory device (14) for storing input and output buffers may also be included. Communications between the digital transmissions receiver (10), the correlator co-processor (12), and the optional memory device (14) are carried out over co-processor interface (16). The correlation co-processor (12) performs correlation operations at the request of the digital transmissions receiver (10). Power consumption in the correlation co-processor (12) is reduced by performing the requested correlation operations in stages. The number of stages used is inversely proportional to the number of gates required to implement the correlation function. Thus, the more stages used, the fewer gates required. This, in turn, provides lower power consumption as compared with a non-staged implementation of the correlation function. Various types of correlations may be performed as indicated by correlation control signals received from the digital transmissions receiver (10). A correlation controller, not shown, included in the correlation co-processor (12), keeps track of the various stages and with the data appropriate to each stage. When all stages necessary to process a particular received signal are complete, the recovered symbol rate data is stored in an output buffer, not shown, to await symbol rate processing by the digital transmissions receiver (10).

5 Claims, 5 Drawing Sheets

| n | SPEED (MHz) | INP BUFF(n x 8) | | ADDER TREE | | ACCUMULATOR | | OUT BUFF(256 x 32) | | PN AND WALSH | | TOTAL POWER | TOTAL GATES |
|---|---|---|---|---|---|---|---|---|---|---|---|---|---|
| | | GATES | POWER | GATES | POWER (simul) | GATES | POWER | GATES | POWER | GATES | POWER | (sim) | |
| 8 | 32 | 5,600 | 0.4 | 1760 | 0.579 | 138 | 0.38 | 10,000 | 3.68 | 2000 | 1.5 | 6.539 | 21,498 |
| 16 | 16 | 11,000 | 0.35 | 4120 | 0.642 | 138 | 0.2 | 10,000 | 1.84 | 2000 | 1.5 | 4.532 | 29,258 |
| 32 | 8 | 22,000 | 0.3 | 8640 | 0.708 | 138 | 0.1 | 10,000 | 0.92 | 2000 | 1.5 | 3.528 | 44,778 |

PROGRAMMABLE CORRELATOR COPROCESSOR DEVICE AND METHOD

This application claims priority under 35 U.S.C. §119(e)(1) of provisional application Ser. No. 60/073,736, filed Feb. 5, 1998.

TECHNICAL FIELD OF THE INVENTION

This invention relates generally to correlation processing in receiver devices and more particularly to a programmable correlator co-processing device.

BACKGROUND OF THE INVENTION

Communications issues are driving changes in the design and application of electronic devices such as digital processors. As the demand for fast, reliable, low power communications solutions increases, tradeoffs inevitably come into play. One tradeoff is device floorplan or area and power consumption. In general, the more electronic components, i.e., gates, needed to implement a device, the more power the device requires. Fewer gates means less power but, the application may not be as efficiently executed as it could be. A particularly large power consumption function in most digital receiver application is the correlation function. Thus, this area is ideal for re-designing for gains in efficiency.

What is needed is a low power, area efficient device that performs correlations on demand.

SUMMARY OF THE INVENTION

The present invention is a digital transmissions receiver system which includes a digital transmissions receiver and a correlation co-processor. The correlation co-processor performs correlation operations at the request of the digital transmissions receiver. Power consumption in the correlation co-processor is reduced by performing the requested correlation operations in stages. The number of stages used is inversely proportional to the number of gates required to implement the correlation function. Thus, the more stages used, the fewer the gates required. This, in turn, provides lower power consumption as compared with a non-staged implementation of the correlation function. Various types of correlations may be performed as indicated by correlation control signals received from the digital transmissions receiver. A correlation controller, included in the correlation co-processor, keeps track of the various stages and with the data appropriate to each stage. When all of the stages necessary to process a particular piece of data are complete, the recovered symbol rate data is stored in an output buffer to await symbol rate processing by the digital transmissions receiver.

These and other features of the invention that will be apparent to those skilled in the art from the following detailed description of the invention, taken together with the accompanying drawings.

DESCRIPTION OF THE INVENTION

Figure 1:
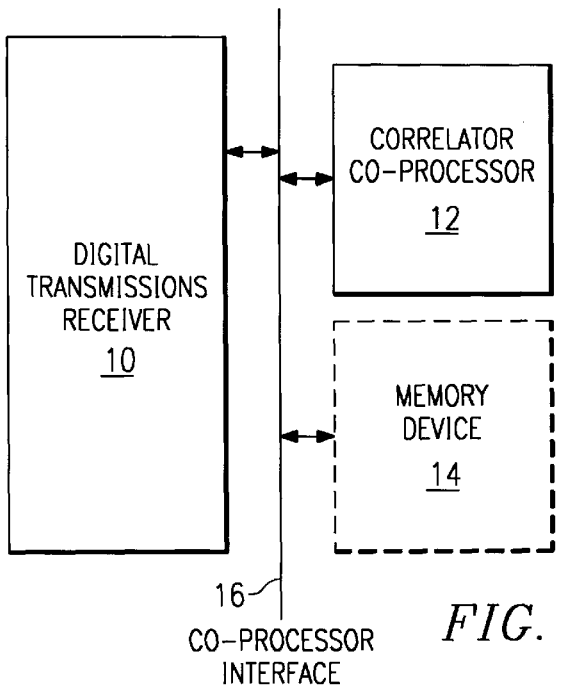
FIG. 1 is a diagram of a digital transmissions receiver system in accordance with the present invention.

The present invention, as shown in FIG. 1, is a digital transmissions receiver system that includes a programmable correlator co-processor 12 for a digital transmissions receiver 10 such as a RAKE receiver in a CDMA system or a global positioning system (GPS) receiver. The programmable correlation co-processor 12 is operable to perform all correlation functions for the digital transmissions receiver 10 in accordance with correlation parameters generated by the digital transmissions receiver 10. The correlation co-processor is operable to perform the correlation functions in stages, thus requiring fewer gates to implement the correlator which in turn provides for a reduction in power consumption as compared with a non-staged implementation of the correlation function. Optionally, a separate memory device 14 may also be included in the digital transmissions system shown in FIG. 1. In the preferred embodiment of the present invention, the digital transmissions receiver 10 is implemented on a digital signal processor (DSP).

The digital transmissions receiver 10 and the memory device 14 are interfaced with the programmable correlator co-processor 12 through a co-processor interface 16. Methods of implementing the co-processor interface 16 include direct memory access (DMA), memory map, or a separate transfer controller.

Direct memory access is a technique for transferring data from the main memory on one device, i.e., the main memory of the digital transmissions receiver 10, to another device without passing it through a central processing unit (CPU). Devices that use DMA channels to transfer data can transfer that data much quicker than those that do not. This feature is especially useful in time sensitive applications such as cellular communications.

A memory map provides a logical connection between the devices. One device, i.e., the programmable correlator co-processor 12, includes a file that defines all variables and an associated memory address of another device, i.e., the digital transmissions receiver device 10, which is the location in which that variable is stored. Other methods of implementing the co-processor interface 16 will be readily apparent to one of ordinary skill in the art.

For purposes of explanation, the preferred embodiment will be described hereinbelow with the digital transmissions receiver 10 implementing the RAKE receiver function for a CDMA system. A CDMA system is a spread spectrum system in which transmission bandwidth is several orders of magnitude greater than the minimum required signal bandwidth. While inefficient for a single user, in multiuser transmission systems such as CDMA, many users can occupy the same bandwidth at the same time with minimal interference with each other. The transmitted signal is spread across the transmission bandwidth using a pseudo-random (PN) sequence or PN code which is a binary sequence that can be deterministically reproduced at the receiver. Spread spectrum signals are de-spread at the receiver by crosscorrelating the received signal with a locally reproduced version of the PN code used to spread the signal before transmission.

The transmitted signal is spread across the transmission bandwidth by artificially increasing the bit data rate. The bit data rate is increased by multiplying the transmitted signal by the PN code which is a sequence of high data rate bits referred to as "chips", which divides the transmitted signal into smaller bits. In a typical application which uses CDMA, i.e., cellular telephone communications, each PN code represents a particular user and separates transmissions of that user from those of other users.

One principal advantage gained by using spread spectrum signals is that they are inherently resistant to multipath fading. In other words, time delayed versions of the transmitted signal seen at the receiver do not correlate well with the original PN sequence and can thus be easily separated from the actual desired signal component. The RAKE receiver takes advantage of the existence of multipath components in the received signal to improve performance. The RAKE receiver consists of several correlators, referred to as "fingers", each of which is designed to correlate with a particular one of the multipath components, and combines the multipath components to provide a better signal. Each of the multipath components detected may be weighted according to their relative strength before being combined with the other multipath components. Each finger of the RAKE receiver may also synchronize to multiple channels. Each channel is separated using a Walsh code similarly to how separate users are distinguished using PN codes.

Figure 3A:
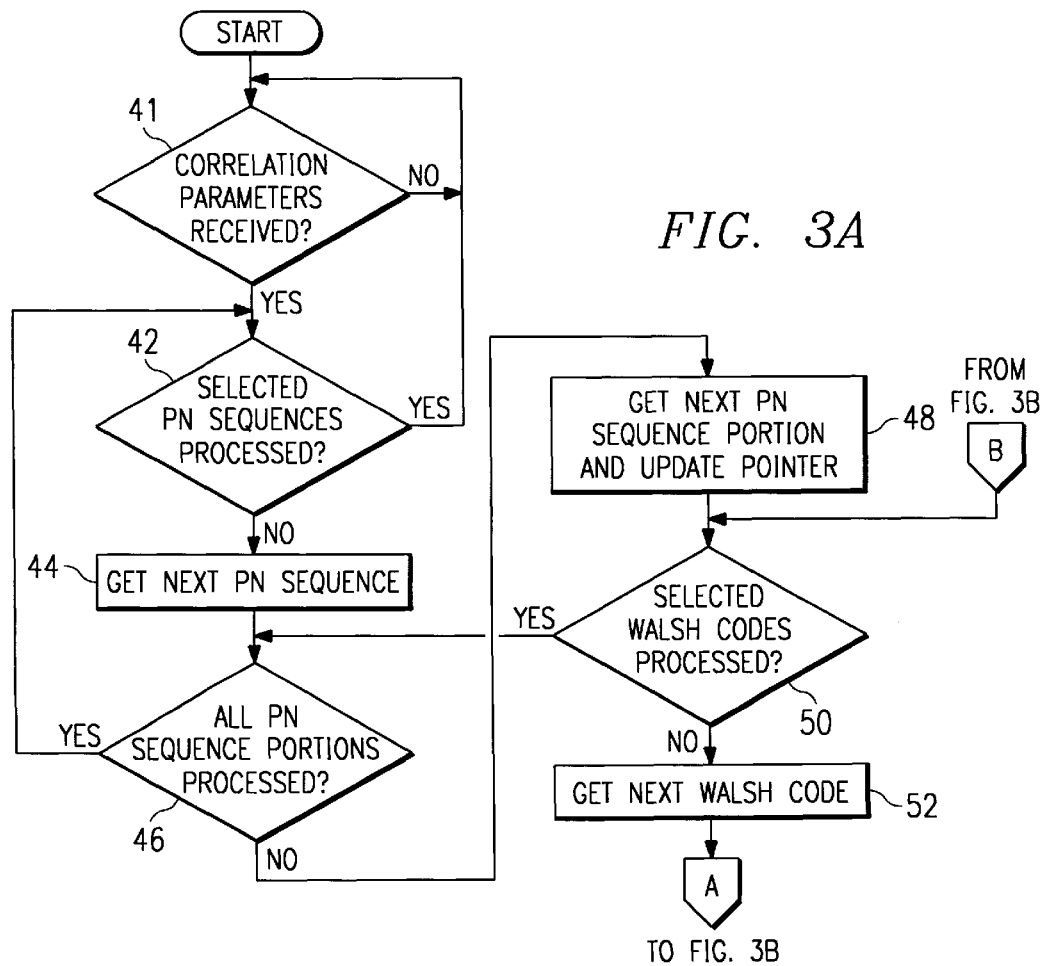
FIG. 3 depicts a flow diagram illustrating the operation of the correlation controller included in the correlation co-processor of the present invention.
Figure 2:
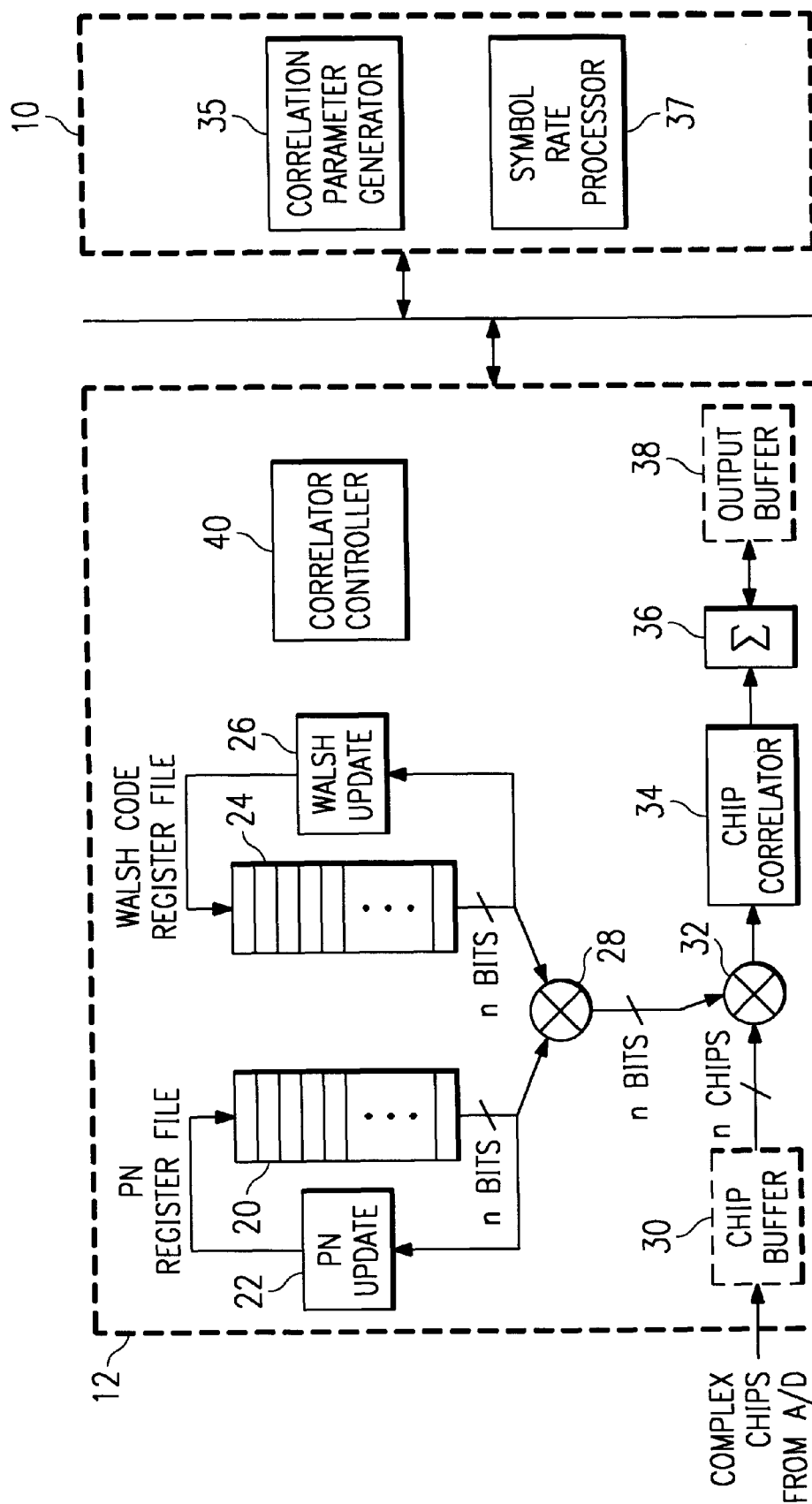
FIG. 2 shows a detailed diagram of the correlation co-processor and digital transmissions receiver included in the digital transmissions receiver system of the present invention.
Figure 3B:
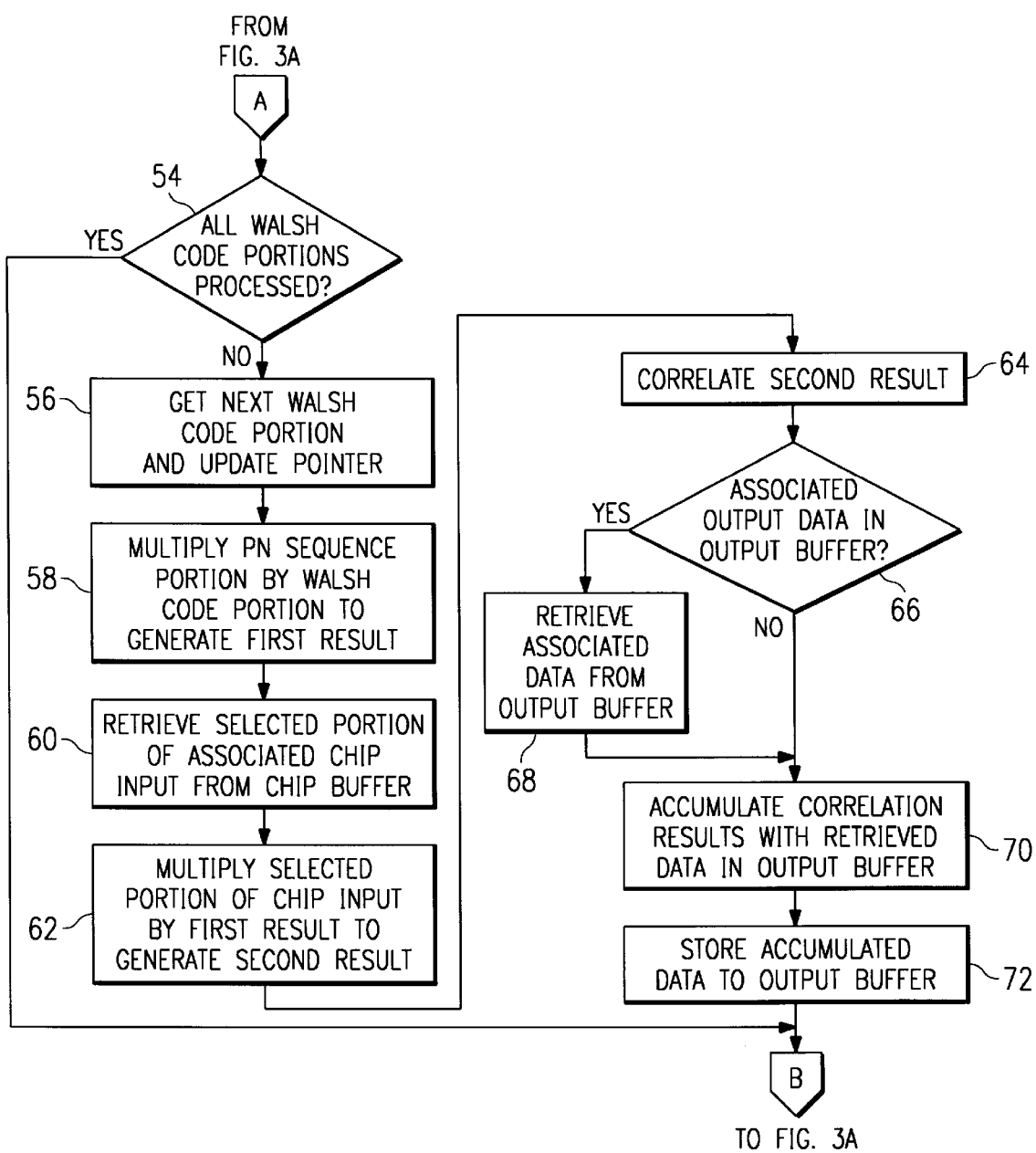

FIG. 2, shows the structure of and data flow in the programmable correlator co-processor 12. As shown in FIG. 2, the programmable correlator co-processor 12 includes a psuedo-noise (PN) code register file 20, PN update module 22, a Walsh code register file 24, Walsh update module 26, a first multiplier 28, an input chip buffer 30, a second multiplier 32, a chip correlator 34, an accumulator 36, output buffer 38, and correlation controller 40. In the preferred embodiment of the present invention, the chip buffer 30 is implemented in memory on the correlation co-processor and the output buffer 38 in implemented in static random access memory (SRAM) on the digital transmissions receiver 10. Other implementations of the chip buffer 30 and the output buffer 38 will be readily apparent to one of ordinary skill in the art. Each of these features are discussed in detail hereinbelow in reference to the operation of the correlation controller 40 as shown in the flow diagram in FIG. 3.

As noted hereinabove, the programmable correlation co-processor 12 performs all correlation functions for the digital transmissions receiver 10. As transmitted signals are received by the digital transmissions receiver 10, the chip buffer 30 accepts as input complex chips from an analog-to-digital converter, not shown. The chips are complex in that they have both a real and an imaginary component. During both acquisition and subsequent tracking of the transmitted signals, the digital transmissions receiver 10 requires correlation functions. Instead of performing these functions, the digital transmissions receiver 10 is operable to generate parameters whenever correlation functions are needed. These parameters are then transmitted to the correlation co-processor 12 which is operable to simulate the required fingers and channels as indicated by the correlation parameters received from the digital transmissions receiver 10.

The PN code register file 20 is a group of storage registers on the correlator co-processor 12 that store PN code and offset information for each RAKE finger requested by the digital transmissions receiver 10. The Walsh code register file 24 is a group of storage registers that store orthogonal Walsh sequences corresponding to pilot, control and traffic channels in the CDMA system. The PN code update module 22 and the Walsh code update module 28 advance the codes in the PN code register file 20 and in the Walsh code register file 24, respectively, as processing proceeds.

Thus, the correlation paramaters generated by the digital transmissions receiver 10 include PN code selection information, Walsh code selection information, address of the chip buffer 30, address of the output buffer 38, and other information such as execution mode and timing information. Both the PN code selection information and the Walsh code selection information may indicate the use of a single code in the PN code register file 20 and the Walsh code register file 24, respectively, or a range of codes over which correlation processing is requested. The execution mode parameter indicates whether the correlations performed are sliding window correlations (usually done when in acquisition mode) or symbol-by-symbol correlation. Using the chip buffer 30 addressing information and the output buffer 38 addressing information, the correlation controller 40 of the correlation co-processor of the present invention then controls execution of the requested correlations.

To provide the correlations using a minimum of power, the correlation controller 40 is operable to perform the requested correlations of the requested chips stored in the chip buffer 30 in portions. For example, in the preferred implementation, the correlation co-processor operates at 16 Ksymbols/second. At 256 chips per symbol, the correlation controller 40 processes each symbol in 32 chip portions. Thus, four cycles are needed to process each symbol. The digital transmissions receiver 10, upon detection of a symbol in the output buffer 38 then proceeds with its symbol rate processing functions. The correlation controller 40 is thus also operable to coordinate processing of and storage of the required chip portions using the addressing information received from the digital transmissions receiver 10.

Returning to FIG. 3, at decision block 40, once correlation parameters are received, processing continues to decision block 42 where the correlation controller 40 determines if all of the selected PN code sequence or sequences (representing requested users) have been processed. If not, processing continues at block 44 where the next requested PN sequence is retrieved from the PN code register file 20. At decision block 46, the correlation controller 40 determines if all portions of the current PN code sequence have been processed. If yes, processing continues at decision block 42 so that the next PN code sequence may be retrieved. Otherwise, the next portion of the current PN sequence is retrieved from the PN code register file 20 and the PN code register file 20 pointer is updated by the PN update module 22.

At decision block 50, the correlation controller 40 determines if the requested Walsh codes (representing the requested channels) have been processed. If yes, processing continues at decision block 46 where the next portion of the current PN code sequence is retrieved. Otherwise, the next Walsh code is retrieved at block 52.

At decision block 54, the controller 40 determines if all portions of the currently selected Walsh code has been processed. If yes, processing again continues at decision block 50 so that the next Walsh code may be retrieved. Otherwise, processing continues at block 56 where the next portion of the currently selected Walsh code is retrieved and the pointers to the Walsh code register file 24 are updated by the Walsh update module 26.

Processing then continues at block 56 where the product of the current PN code portion and the current Walsh code portion is generated by the multiplier 28. At block 60, the correlation co-controller 40 then retrieves the selected portion of the associated chip input from the chip buffer 30 in accordance with the chip address information received from the digital transmissions receiver 10. At block 62, the product of the associated chip input portion and the result from the multiplier 28 is then generated by the multiplier 32. At block 64, the resulting product is then correlated using the chip correlator 34.

The chip correlator 34 is a fast adder tree that is operable to add n chips, each multiplied by n bits of the product of the PN code sequence and Walsh code obtained from PN code register file 20 and the Walsh code register file 24, respectively. The chip correlator 16 is fast enough to perform all correlations necessary to implement each finger and each channel on each finger. For example, at a chip rate of 4 MHz, to support eight (8) fingers with eight (8) channels each and with a spreading factor of 256, the chip correlator 34 performs 64 (256 chip) correlations in one symbol period (256 chips). Thus, for n>16, the chip correlator 34 operates at 16 MHz for the above example.

The accumulator, or combiner, 36 combines the correlated output signals from the chip correlator 34 in with associated data from other portions if determined at decision block 66 that other portions of the symbol currently being processed have previously been stored. The associated data, if detected, is retrieved at block 68 and accumulated with the correlation results at block 70. The combined output signal from the accumulator 36 is then stored in the output buffer 38. For efficient transfer of data from the correlator co-processor 40 to the digital transmissions receiver 10, it is contemplated that the output buffer 38 be readable by the digital transmissions receiver 10 (i.e., be implemented in the digital transmissions receiver 10 memory space).

Again using the RAKE receiver implementation as an example, after the acquisition stage, the correlation controller 40 generates control sequences to multiplex the correlator datapath to perform the various correlations that need to be done by the various fingers. The finger information such as PN code sequence to use, PN offset, sampling offset, number of channels and their Walsh codes, etc. are written into the PN code register file 22 or the Walsh code register file 24. This information is then used by the correlation controller 40 to sequence through the active fingers.

The digital transmissions receiver 10 implements, using symbol rate processor 37, functions such as overall PN search control during acquisition, finger allocation, time and frequency tracking, phase correction, combining symbols from the fingers, and some symbol post-processing functions such as de-interleaving and Viterbi decoding. It is contemplated that additional hardware accelerators (i.e., co-processors) may be used to assist the digital transmissions receiver 10 with other functions such as Viterbi decoding.

The digital transmissions receiver 10 programs the correlation co-processor 40 in the RAKE receiver implementation by writing finger and channel information to PN code register file 20 and the Walsh code register file 24, respectively, in the correlation co-processor 40. The digital transmissions receiver 10 communicates with the correlation co-processor 40 during certain time slots that are communicated to the digital transmissions receiver 10 as periodic interrupts, which the digital transmissions receiver 10 enables only when it needs to communicate with the correlation co-processor 40.

A global chip clock, not shown, keeps track of absolute time. The global chip clock has a period equal to one "time slot" which is typically defined in the radio standard (e.g., NTT has 625 $\mu$s time slots). The digital transmissions receiver 10 informs the correlator co-processor 40 as to the starting point of each newly programmed finger by means of the chip clock.

Figures 4, 5, 6:
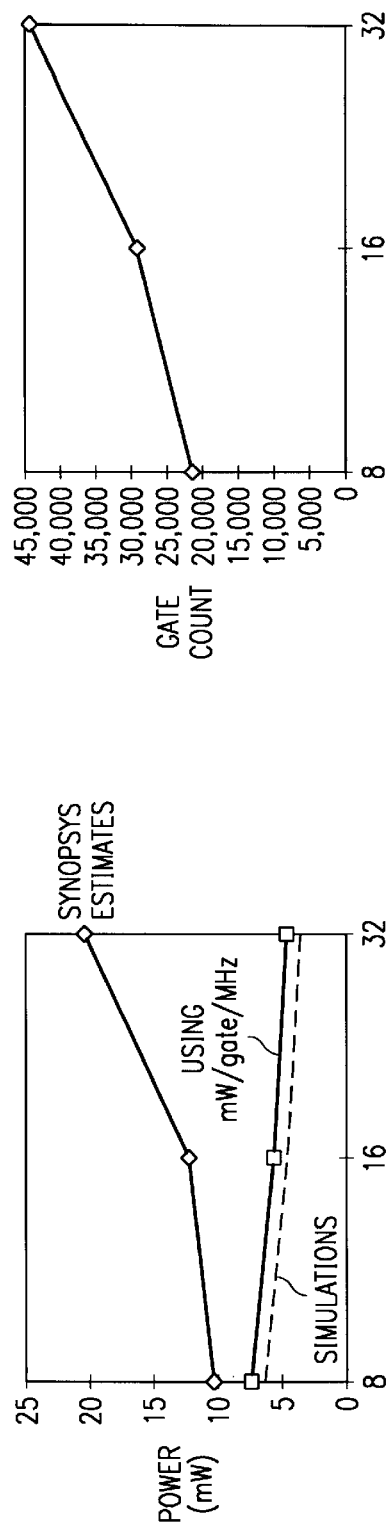
FIG. 4 is a table showing gate and power tradeoffs as the number of stages in the correlation co-processor increase.
FIG. 5 shows a graph of total power versus number of chips processed in a cycle.
FIG. 6 illustrates a graph of total gate count versus number of chips processed in a cycle.

FIG. 4 shows a table illustrating exemplary power and gate count numbers as the number of stages, n, implemented in the correlation co-processor 40 changes. The data shown in the table in FIG. 4 assumes execution at a chip rate of 4 MFz and 5 bit input precision on the complex chip inputs.

FIG. 5 shows a graph of total power versus number of chips processed in a cycle. As shown in the graph, a implementation of the correlation co-processor 40 where 32 chips are processed at one time, i.e., in each stage, yields the best area/power tradeoff.

FIG. 6 illustrates a graph of total gate count versus number of chips processed in a cycle. Various implementations of the adder tree used to implement the chip correlator 34, including a Wallace tree adder and a binary tree with carry look-ahead or ripple carry at the tree nodes were tried. The best tree structure was the binary tree with ripple carry adders at the tree nodes.

Figure 7:
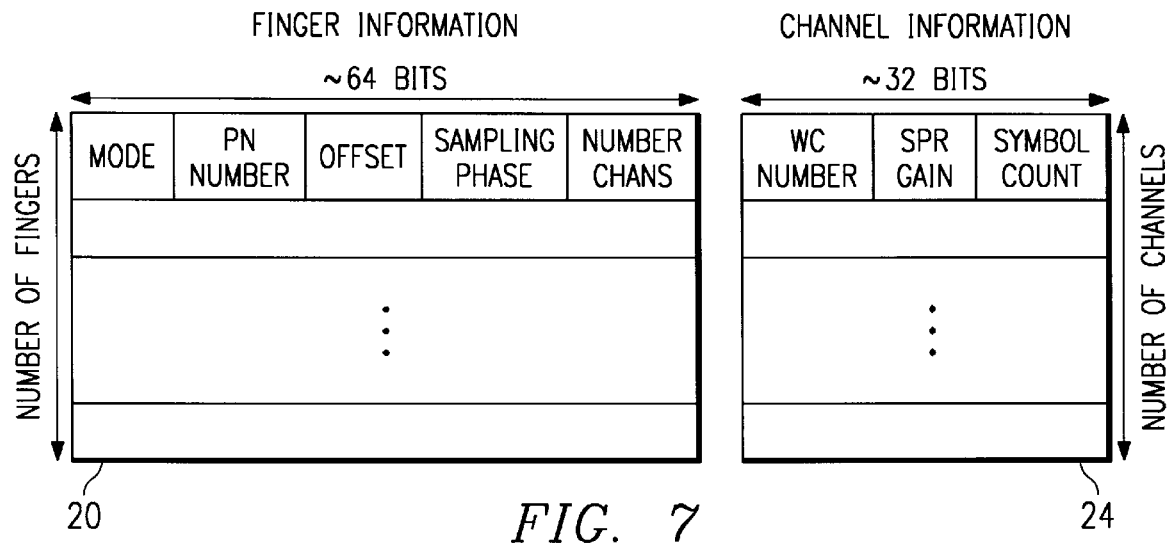
FIG. 7 is an exemplary implementation of the PN code register file and of the Walsh code register file.

FIG. 7 is an exemplary implementation of the PN code register file 20 and of the Walsh code register file 24. The modes of operation as indicated by the correlation parameters include sliding window search, correlation with a set of given codes, normal despreading, operation only at marker positions, etc. Each despreading finger, as indicated in the PN code register file 20, operates on the same set of traffic channels, as indicated in the Walsh code register file 24.

Figure 8:
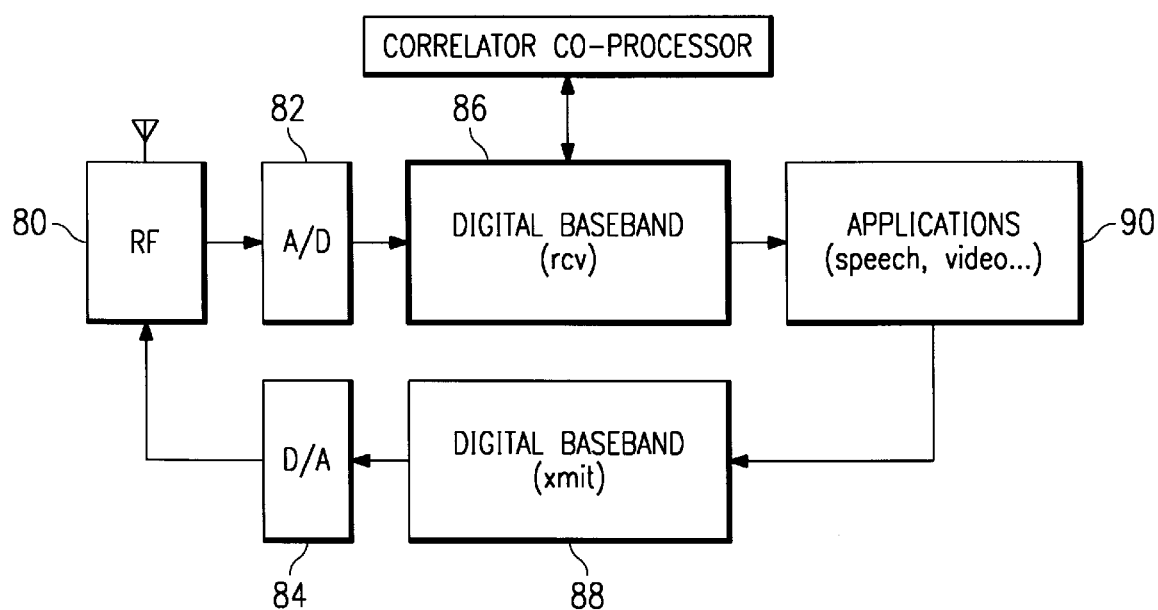
FIG. 8 shows another exemplary digital receiver system which uses the correlator co-processor of the present invention.

FIG. 8 shows another exemplary digital receiver system which uses the correlator co-processor of the present invention. RF signals at 80 are input to the analog-to-digital (A/D) converter 82. The converted input signals are then input into a digital baseband receiver 86 which uses the correlation co-processor 40 of the present invention to perform all needed correlation functions. The resulting symbol rate signals are input into an exemplary application 90 which then provides data to be transmitted to digital baseband transmitter 88. The signals to be transmitted are passed through a digital-to-analog (D/A) converter 84 before being transmitted as RF signals at 80.

EMBODIMENTS

Although the present invention and its advantages have been described in detail, it should be understood that various changes, substitutions and alterations can be made herein without departing from the spirit and scope of the invention as defined by the appended claims.

What is claimed is:

1. A digital transmissions receiver system, comprising:
   a digital transmissions receiver operable to generate correlation parameter signals defining correlation operations as needed to synchronize to received signals; and
   a programmable correlator co-processor, responsive to said digital transmissions receiver, and operable to perform said correlation operations in stages in accordance with said correlation parameter signals and, upon completion of said stages, is further operable to provide retrieved symbol rate data to said digital transmissions receiver for further processing.

2. The system of claim 1 wherein said programmable correlation co-processor executes on a first processor and said digital transmissions receiver executes on a second processor.

3. A method for controlling synchronization with a received signal, comprising the steps of:

storing the received signal to an input buffer;

generating correlation parameters for synchronizing with the received signal;

correlating a selected portion of the received signal in stages in accordance with said correlation parameters;

repeating said correlating step until all portions of the received signal have been correlated; and storing the correlated result to an output buffer for processing.

4. The method of claim 3 wherein said generating step includes the step of generating said correlation parameters whenever correlation functions are needed.

5. The method of claim 4 wherein said correlation parameters include PN code selection information, Walsh code selection information, execution mode and timing information.

* * * * *